March 26, 1929.  S. B. STINE  1,706,636

TOOL AND METHOD OF MAKING THE SAME

Filed May 19, 1927

INVENTOR
Samuel Blaine Stine
By Archworth Martin,
Attorney.

Patented Mar. 26, 1929.

1,706,636

UNITED STATES PATENT OFFICE.

SAMUEL BLAINE STINE, OF OSCEOLA MILLS, PENNSYLVANIA.

TOOL AND METHOD OF MAKING THE SAME.

Application filed May 19, 1927. Serial No. 192,603.

My invention relates to the manufacture of tools of various kinds and is hereinafter described more particularly in connection with the formation of a knife or auger member for pug mills, such as are employed in the working of clay and shale.

In the making of blades or knives for pug mills and the like, the shank and the blade portions thereof have been commonly formed integrally by a forging operation or by casting from iron or steel. The forging process is quite costly, and the cast structures are brittle and snap off at their shanks, intermediate the blade and the point of attachment to the auger shaft.

One object of my invention is to secure the advantages of a forged structure at comparatively small expense and without the weakness of the cast structures.

Another object of my invention is to simplify and improve generally the structure and method of making tools.

Figure 1:
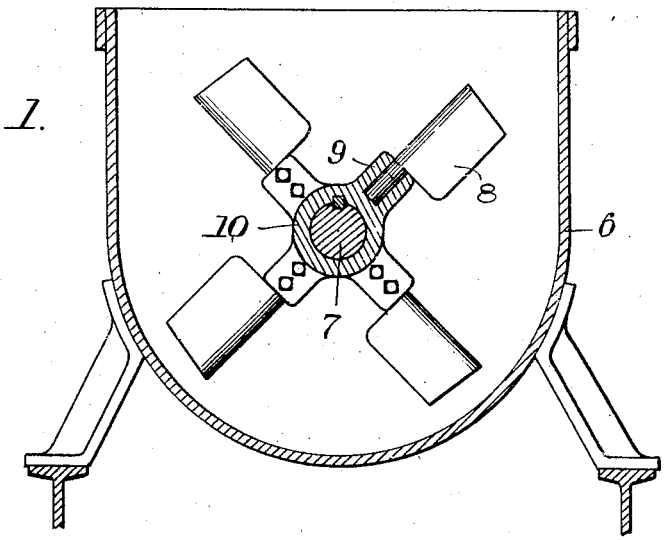
Figure 2:
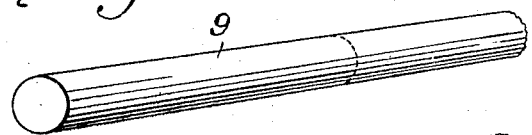
Figure 3:
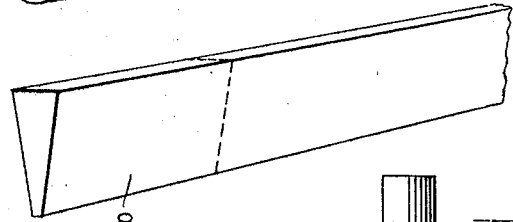
Figure 4:
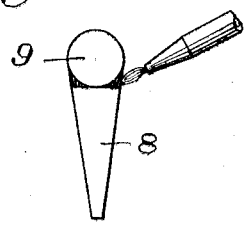
Figure 5:
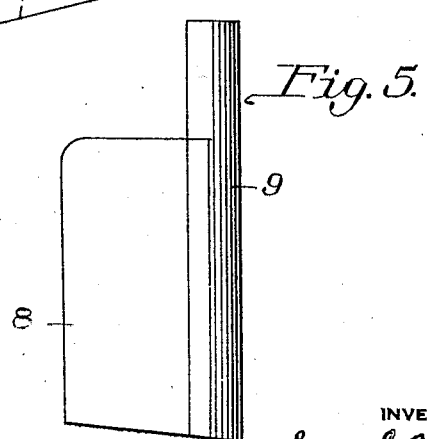

One form which my invention may take is shown in the accompanying drawing, wherein Figure 1 is a cross sectional view of a pug mill equipped with knives of my improved form; Fig. 2 is a perspective view showing a bar from which the shank or handle portion of the tool is formed; Fig. 3 is a perspective view showing a bar from which the working portion of the tool may be severed for attachment to the handle; Fig. 4 is a cross sectional view of the parts of Figs. 2 and 3, showing one manner in which they may be secured together, and Fig. 5 is a view showing the completed tool.

In Fig. 1, I have shown a pug mill casing 6 of any usual form and an auger shaft 7, to which are secured blades or knives 8 to be hereinafter described. The blades are disposed at an angle to the diametral plane of the figure so that the clay or other material will be properly advanced as the shaft 7 rotates. The blades are provided with shank portions 9 that may be of cylindrical or other form and are maintained in position on the shaft 7 by means of a collar 10 that is suitably fastened to the shaft, and which has sockets and set screws or keys for rigidly holding the blades in their set position.

The shanks or handles 9 are cut from lengths of standard shafting and may be of other cross sectional forms, and of any suitable metallic material. The blades or knives 8 are cut from previously-formed bars or otherwise formed, and preferably have their upper surfaces of a width slightly less than the diameter of the handle 9, and will usually be of less length than the handle 9. The member 8 is preferably a forging.

The members 8 and 9 are secured together by arc welding or a flame, the welding metal being deposited between adjacent surfaces thereof in the manner shown in Fig. 4, to fill the spaces between the blade and the bar and thus provide smooth sides to the unit, besides giving it great strength, since the blade is supported for the entire distance across its base.

The bars from which the shanks 9 are formed will preferably be of commercial rolled stock and the bar from which the working portions 8 of the tools are cut may also be of rolled stock, with the result that the tool will be of much greater strength than if cast and will of course be far cheaper than those tools formerly made entirely by forging processes. It will be understood that the parts 8 and 9 may be secured together in various other ways than by arc welding or by an acetylene flame.

I claim as my invention:—

1. The method which comprises dividing a circular bar into desired lengths and welding the flat base of a wedge-like tool to each of the divided portions, each base and its bar having contact throughout the entire length of the base.

2. The combination with a handle of cylindrical form, of a tool of wedge-like form having its base in engagement with one side of the handle and secured thereto by welding metal deposited in the spaces between the flat and cylindrical surfaces of the tool and the handle respectively.

3. The combination with a handle of cylindrical form, of a wedge-like tool whose base portion is of less width than the diameter of the handle and which is secured to the handle by metal deposited in the spaces between the flat base of the tool and the adjacent cylindrical surface of the handle.

In testimony whereof I, the said SAMUEL BLAINE STINE, have hereunto set my hand.

SAMUEL BLAINE STINE.